(12) United States Patent
Cao et al.

(10) Patent No.: US 12,418,579 B2
(45) Date of Patent: Sep. 16, 2025

(54) THREE-CLASS VERTEX DEGREE AWARE-BASED 1.5-DIMENSIONAL GRAPH DIVISION METHOD AND APPLICATION

(71) Applicant: Research Institute of Tsinghua University in Shenzhen, Shenzhen (CN)

(72) Inventors: Huanqi Cao, Beijing (CN); Yuanwei Wang, Beijing (CN)

(73) Assignee: Research Institute of Tsinghua University in Shenzhen, Shenzhen (CN)

( * ) Notice: Subject to any disclaimer, the term of this patent is extended or adjusted under 35 U.S.C. 154(b) by 0 days.

(21) Appl. No.: 18/901,324

(22) Filed: Sep. 30, 2024

(65) Prior Publication Data

US 2025/0097282 A1    Mar. 20, 2025

Related U.S. Application Data

(63) Continuation of application No. PCT/CN2022/114563, filed on Aug. 24, 2022.

(30) Foreign Application Priority Data

Mar. 31, 2022    (CN) .......................... 202210346311.8

(51) Int. Cl.
H04L 67/10        (2022.01)
G06F 9/50         (2006.01)

(52) U.S. Cl.
CPC ............ *H04L 67/10* (2013.01); *G06F 9/5066* (2013.01); *G06F 2209/501* (2013.01); *G06F 2209/5011* (2013.01); *G06F 2209/505* (2013.01)

(58) Field of Classification Search
CPC . H04L 67/10; G06F 9/5066; G06F 2209/501; G06F 2209/5011; G06F 2209/505
See application file for complete search history.

(56) References Cited

U.S. PATENT DOCUMENTS 8,090,809 B2 * 1/2012 Tan .......................... H04L 41/12
709/224
2016/0342445 A1 * 11/2016 van der Lugt .......... H04L 67/10
(Continued)

FOREIGN PATENT DOCUMENTS

| CN | 111737540 A | 10/2020 |
| CN | 112445940 A | 3/2021 |
| CN | 114880112 A | 8/2022 |

OTHER PUBLICATIONS

Julian Shun and Guy E Blelloch. 2013. Ligra: a lightweight graph processing framework for shared memory. In Proceedings of the 18th ACM SIGPLAN symposium on Principles and practice of parallel programming. 135-146.
(Continued)

*Primary Examiner* — Wissam Rashid
(74) *Attorney, Agent, or Firm* — IPro, PLLC; Na Xu (57) ABSTRACT

Provided are a distributed parallel computing-based graph computing method, a distributed parallel computing system, and a computer readable medium. The graph computing method comprises: obtaining data of a graph to be computed, dividing vertexes into a first extremely high degree class E, a second high degree class H, and a third regular class R, forming a super node by a predetermined number of compute nodes, the communication between nodes in a super node being faster than the communication between nodes across the super node, and dividing the nodes into grids, one node in each grid, the internal nodes in one super node being logically arranged in a row, vertices being evenly divided into the nodes according to numbers, Ri and Ro (Continued)

being maintained by the nodes to which Ri and Ro belong, the state of an Ho vertex being synchronously maintained on a column, the state of an Hi vertex being synchronously maintained on the column and the row, and the states of Eo and Ei vertexes being globally and synchronously maintained. According to the three-level vertex division method, sub-graphs are well balanced between the nodes, thereby facilitating elimination of repeated sending of a message to a same super node, and avoiding a high-cost global delegate.

17 Claims, 3 Drawing Sheets

(56) References Cited

U.S. PATENT DOCUMENTS

| | | | | |
|---|---|---|---|---|
| 2018/0081986 | A1* | 3/2018 | Sitik | G06F 16/9024 |
| 2021/0334690 | A1* | 10/2021 | Huang | G06F 18/2323 |
| 2022/0019545 | A1 | 1/2022 | Bertacco et al. | |

OTHER PUBLICATIONS

Yunming Zhang, Mengjiao Yang, Riyadh Baghdadi, Shoaib Kamil, Julian Shun, and Saman Amarasinghe. 2018. Graphit: A highperformance graph dsl. Proceedings of the ACM on Programming Languages 2, OOPSLA (2018), 1-30.

Xiaowei Zhu, Wenguang Chen, Weimin Zheng, and Xiaosong Ma. 2016. Gemini: A computation-centric distributed graph processing system. In 12th Usenix symposium on operating systems design and implementation (OSDI 16). 301-316.

Roshan Dathathri, Gurbinder Gill, Loc Hoang, Hoang-Vu Dang, Alex Brooks, Nikoli Dryden, Marc Snir, and Keshav Pingali. 2018. Gluon: a communication-optimizing substrate for distributed heterogeneous graph analytics. Sigplan Not. 53, 4 (Apr. 2018), 752-768.

Steffen Maass, Changwoo Min, Sanidhya Kashyap, Woonhak Kang, Mohan Kumar, and Taesoo Kim. 2017. Mosaic: Processing a Trillion-Edge Graph on a Single Machine. In Proceedings of the Twelfth European Conference on Computer Systems (EuroSys '17). Association for Computing Machinery, New York, NY, USA, 527-543.

Huanqi Cao, etc. "Scaling Graph Traversal to 281 Trillion Edges with 40 Million Cores." ACM SIGPLAN Annual Symposium Principles and Practice of Parallel Programming. Mar. 28, 2022, pp. 234-245.

* cited by examiner

THREE-CLASS VERTEX DEGREE AWARE-BASED 1.5-DIMENSIONAL GRAPH DIVISION METHOD AND APPLICATION

TECHNICAL FIELD

The present invention generally relates to 3-class (or 3 level) vertex degree-aware 1.5-dimensional graph partitioning methods and applications, and more specifically to large-scale graph computing methods, distributed parallel computing systems and computer-readable media.

BACKGROUND

The graph computing framework is a general programming framework used to support graph computing applications. On China's new generation Sunway supercomputer, a new generation of "Shentu" ultra-large-scale graph computing framework is provided to support large-scale graph computing applications with at most full-machine scale, tens of trillions of vertices, and three hundred billion edges.

Graph computing applications are data-intensive applications that rely on data consisting of vertices and edges connecting two vertices for computation. Typical applications include PageRank for web page importance ranking, breadth-first search (BFS) for graph traversal, label propagation for weakly connected component (WCC) solving of graphs, single source shortest path (SSSP), etc.

In the field of general graph computing, cutting-edge work in recent years has mainly focused on single machines or smaller-scale clusters. Work on single-machine memory includes Ligra (non-patent document [1]) and its research group's subsequent GraphIt non-patent document [2], which respectively introduced a set of simplified vertex center representations, a special language for graph computing, and adopted NUMA-aware, segmented subgraph and other memory optimizations; work on distributed memory includes the Gemini non-patent document [3] of this research group, and the Gluon (also known as D-Galois) non-patent document proposed by international peers later [4], solved the parallel processing of graph computing problems on small-scale clusters from several to hundreds of nodes from different perspectives. In addition, Mosaic non-patent literature [5] has done excellent work on external storage, using a single node with multiple SSDs to complete the processing of a billion-edge graph.

Large-scale graph data needs to be divided into various computing nodes of the distributed graph computing system. There are usually two types of partitioning methods: one-dimensional partitioning methods and two-dimensional partitioning methods. The one-dimensional partitioning method is a point-centered partitioning method. According to this method, the vertices in the data graph are evenly divided into different machines, and each vertex and all its adjacent edges are stored together, so that heavy vertices (Vertices with high out-degree or in-degree) will set up delegates at many nodes. The two-dimensional partitioning method is an edge-based partitioning method. Different from the one-dimensional partitioning, the two-dimensional partitioning evenly distributes the edges (rather than points) in the graph to each computing node to achieve load balancing. The two-dimensional partitioning is equivalent to deploying delegates on the rows and columns where the vertex locates. For large-scale graph computing, the load of graph data is seriously unbalanced, which is manifested in the severe imbalance of edges at different vertices, and the degrees of different vertices are very different. At this time, both one-dimensional and two-dimensional partitioning will face scalability problems. One-dimensional vertices The partitioning method will cause too many heavy vertices to deploy near-global delegates, and the two-dimensional vertex partitioning method will cause too many vertices to deploy delegates on rows and columns.

In China, supercomputers widely adopt heterogeneous many-core structures. In large-scale computing clusters, each computing node has a large number of computing cores with different architectures. Unbalanced load graph computing also poses a great challenge to domestic heterogeneous many-core structures. It is necessary to optimize graph computing on domestic heterogeneous many-core systems from the perspectives of computing, storage, and communication performance.

The specific information of the above references [1]-[5] is as follows:

[1] Julian Shun and Guy E Blelloch. 2013.Ligra: a lightweight graph processing framework for shared memory. In Proceedings of the 18th ACM SIGPLAN symposium on Principles and practice of parallel programming. 135-146.

[2] Yunming Zhang, Mengjiao Yang, Riyadh Baghdadi, Shoaib Kamil, Julian Shun, and Saman Amarasinghe. 2018. Graphit: A high performance graph dsl. Proceedings of the ACM on Programming Languages 2, OOPSLA (2018), 1-30.

[3] Xiaowei Zhu, Wenguang Chen, Weimin Zheng, and Xiaosong Ma. 2016. Gemini: A computation-centric distributed graph processing system. In 12th USENIX symposium on operating systems design and implementation (OSDI 16). 301-316.

[4] Roshan Dathathri, Gurbinder Gill, Loc Hoang, Hoang-Vu Dang, Alex Brooks, Nikoli Dryden, Marc Snir, and Keshav Pingali. 2018.Gluon: a communication-optimizing substrate for distributed heterogeneous graph analytics. SIGPLAN Not. 53, 4 (April 2018), 752-768.

[5] Steffen Maass, Changwoo Min, Sanidhya Kashyap, Woonhak Kang, Mohan Kumar, and TAESOO KIM. 2017.MOSAIC: Processing A TRILLION-EDGE Graph On A Single M Achine. in Proceedings of the Twelfth EUROPEAN Conference on Computer Systems (EUROSYS '17). Association for Computing Machinery, New York, NY, USA, 527-543.

SUMMARY

In view of the above circumstances, the present invention is proposed.

According to one aspect of the present invention, a graph computing method based on distributed parallel computing is provided, including: obtaining data of a graph to be calculated. The graph includes a plurality of vertices and edges, where each vertex represents a corresponding operation, where each edge connects a corresponding first vertex to a corresponding second vertex, the operation represented by the corresponding second vertex receives as input the output of the operation represented by the corresponding first vertex, and the edge X→Y represents the edge from vertex X to vertex Y, dividing the vertices into the first extremely high degree class, the second high degree class and the third ordinary class according to the degree of the vertices, where the vertices with degrees greater than the first threshold are marked as E and are divided into the first extremely high degree class (or first class of extremely high degree). The vertices with degree between the first threshold and the second threshold are marked as H and divided into the second high degree class (or the second class of high degree). The vertices with degree lower than the second threshold are marked as R and divided into the third original degree class (the third class of ordinary degree). The first threshold is greater than the second threshold; for directed graphs, vertices are divided according to in-degree and out-degree respectively. The in-degree divided set and the out-degree divided set are marked as Xi and Xo respectively, where X is E, H or R. At the same time, a predetermined number of nodes are forming a super node. Each node is a computing device with computing power. The communication speed between nodes within a super node is faster than the communication speed between nodes across super nodes. The nodes are divided into grids (or mesh), with one node in each grid. The internal nodes in one super node are logically arranged in one row, and the vertices are evenly divided into each node according to their serial numbers. Ri and Ro are maintained by the nodes they belong to. The Ho vertex status is synchronously maintained on the column that the Ho vertex belongs to, the Hi vertex status is synchronously maintained on the column that the Hi vertex belongs to and the row that the Hi vertex belongs to, and Eo status and Ei vertex status are synchronously maintained globally. Eo and Ho are collectively called EHo, and Ei and Hi are collectively called EHi.

Preferably, the allocation and storage of delegates corresponding to vertices is performed according to edge conditions as follows: for the edge EHo→EHi, this type of edge is stored in such a node that the node is on the grid column where the source vertex is located, and the node is on the grid row where the target vertex is located; for the edge Eo→Ri, this type of edge is stored at the node where the R vertex is located, so as to allow global maintenance of extremely high-degree vertices during calculation and aggregate their communication messages; for the edge Ho→Ri, this type of edge is stored at such a node, that the node is on the grid column where the H vertex is located, and the node is on the grid row where the R vertex is located, so as to allow the high-degree vertices to be maintained on the column during calculation, and their communication messages are aggregated in the communication across super nodes. For the Ho vertex, when a message needs to be sent to multiple target vertices of the same supernode, because the source vertex has an available delegate node at a location on its own column and on the row where its target vertices are located, a message is first sent to the available delegate across super node, and then sent to all target vertices by the available delegate node through the fast network within the super node; for the edge Ro→Ei, this type of edge is stored on the node where the R vertex is located to allow global maintenance of the extremely high-degree vertices during calculation, and aggregate their communication messages; for the edge Ro→Hi, this type of edge is stored at the node where the R vertex is located, but the H vertex is stored according to the number on the column where the H vertex is located, to allow to accumulate its update messages on the node in the row of R and the column of H during calculation and aggregate network communications across super nodes; for edges Ro→Ri, this type of edges in terms of forward edges and reverse edges is stored at the source vertices and target vertices respectively, and edge messages are implemented by forwarding along rows and columns on the communication grid.

The division of three classes of vertices and six types of edges in the above embodiment can effectively solve the strong load skew caused by the power law distribution: the edges associated with the high-degree vertices, regardless of in-degree or out-degree, will be stored according to the two-dimensional division or one-dimensional division on destination side as appropriate, so at to maintain the number of edges globally evenly, thus ensuring dual balance of storage and load. Such a division can solve the problem of extremely large vertices in extreme graphs.

After the above classification processing, the processing of the H vertex set is much more efficient than the processing of high-degree vertices in a simple one-dimensional division. For example, originally the Ho vertex needs to send messages on each edge, and will send messages to multiple nodes in the same super node, thus consuming the top-level network bandwidth; after this optimization in the present embodiments, the message will only be sent once to each super node, thus saving top-level network. At the same time, since it is only sent once to one delegate node in the target super node, a large amount of useless communication and additional storage will not be introduced.

Preferably, in the graph calculation method, the first threshold is the total number of nodes multiplied by a constant coefficient, and the second threshold is the number of nodes within the super node multiplied by a second constant coefficient.

Preferably, two traversal modes of "push" and "pull" are implemented, and the traversal mode is automatically selected according to the proportion of active vertices. For the three types of locally calculated edges EHo→EHi, Eo→Ri, and Ro→Ei, "pull" or "push" mode is automatically selected according to whether the activity ratio of the target vertices exceeds the configurable threshold; for the three types of locally calculated edges Ho→Ri, Ro→Hi, and Ro→Ri, "pull" or "push" mode is automatically selected according to whether the ratio of the activity ratio of the target vertices to the activity ratio of the source vertices exceeds a configurable threshold.

Preferably, in the graph calculation method, during the breadth-first search, it is judged whether the iteration is at the head or tail or in the middle. When it is judged that the iteration is at the head or tail, the graph traversal is performed by "pulling" from the target vertex to the source vertex; when it is judged that the iteration is in the middle, the manner that the source vertex "push" to the target vertex is used for graph traversal; and in PageRank, for the sub-graphs that locally traverses and reduces, the "pull" mode is used to achieve optimal computing performance; while for subgraphs involving remote edge messages, "push" mode is used to minimize communication volume.

Through the above-mentioned implementation scheme of sub-iteration adaptive direction selection that supports quick exit, the traversal direction can be adaptively switched to avoid useless calculations, minimize communication volume, and optimize graph computing performance.

Preferably, the ultra-large-scale graph calculation method also includes: setting the status flag of the vertex in the pull mode to determine whether the status of a vertex has reached the dead state. In the dead state, the vertex will not respond to more messages. After confirming that the dead state has been reached, skip processing of the remaining messages.

Preferably, for a subgraph in which both the source vertex and the target vertex belong to the first extremely high degree class and the second high degree class, the forward graph is segmented according to the target vertex, and the reverse graph is segmented according to the source vertex. A graph is divided into multiple segmented sub-graphs SSG (Segmented Sub-Graph), so that the target vertices in each segmented sub-graph are limited to a certain range.

The graph (sparse matrix) is segmented according to the target vertex (column of the matrix) through the segmented subgraph method for high-degree vertices in this embodiment, and a graph is divided into multiple SSG components, so that the target vertices in each SSG are limited to a certain range, so as to avoid or alleviate the traditional problem of very poor spatiotemporal locality of accessing data of neighboring vertices due to the excessive range of vertices of a single large graph.

Preferably, the method is performed on a general multi-core processor, and the predetermined range is the size that can be stored in the last level cache LLC (Last Level Cache).

Preferably, the ultra-large-scale graph calculation performs edge processing in pull mode on heterogeneous many-core processors, using the remote access mechanism of local data memory LDM (Local Data Memory) to store a source vertex segmentation of a segmented subgraph SSG in the reverse graph into an LDM of the slave core array, and then during the graph traversal process, data is obtained from the slave core which owns the target vertex, through slave core accessing RLD (Remote Load).

Preferably, the source vertices of the first extremely high degree class and the second high degree class are numbered according to the following rules: from high bit to low bit: segment number; cache line number; slave core number, slave core local number.

Preferably, the number of digits in the cache line number is calculated based on the sum of the sizes of the vertex data elements to ensure that the local data memory LDM can store them all; the next six bits are used to distinguish the slave core numbers to which they belong (a total of $2^6=64$ slave cores); The number of bits in the slave core local number is calculated based on the vertex data element size minimum to ensure DMA efficiency.

Preferably, for each slave core, based on slave core number bit, a direct memory access DMA operation with stride is first used to prefetch the vertex data in the segment; during edge processing in pull mode, when fetching the source vertex EHo of the first extremely high-degree class and the second high-degree class, the local data memory remote load (LDM RLD) is used to read the LDM corresponding address of the slave core that owns the source vertex.

Preferably, for the reduction distribution (Reduce Scatter) type communication of the target vertex EHi of the first extremely high degree class and the second high degree class: for the reduction on rows and columns, a ring algorithm is used; for the global reduction, first transpose the message locally to change the data from row-major to column-major, then first call the reduce scatter on the row, and then call the reduce scatter on the column to reduce the cross-supernode communication on the column.

Through the collective communication optimization described above, cross-supernode communication on the columns can be reduced. Hierarchical reduction distribution eliminates redundant data within supernodes in the first step of reduction on the row, making communication across supernodes in the second step minimal and without redundancy.

Preferably, the ultra-large-scale graph computing method is performed on a heterogeneous many-core processor. In the processing of edge messages, the message generation part and the message rearrangement part use bucketing steps to distribute the messages to the target nodes; slave cores are classified into two categories according to rows, producers and consumers. The producer obtains data from the memory and performs data processing at the current stage. If there is data generated, it is placed in the sending buffer corresponding to the consumer that should process the message according to the target address. When the buffer is full, it will be passed to the corresponding consumer through RMA. The consumer receives the message delivered by RMA and performs subsequent operations that require mutual exclusion; consumers with the same number in each core group are responsible for the same output bucket, and the core group realizes the count of the end of the bucket end position through atomic fetch and add on the main memory.

The on-chip sorting module in the above embodiment directly performs message generation and forwarding bucket operations, achieving slave core acceleration and improving processing efficiency.

Preferably, the ultra-large-scale graph computing method is performed on heterogeneous many-core processors. In the processing of edge messages, the message update part uses two-stage sorting to implement random updates of local vertices: first, perform bucket sorting on all update operations to be performed, cluster the vertices into the same bucket by number, sort all messages into each bucket, and ensure that the number of vertices in each bucket is small enough that the vertex information can be placed in the LDM of a core group, which is called coarse-grained sorting; each in a slave core group processes messages from one bucket at a time, and delivers the message groups to each consumer core through on-chip sorting. Each consumer core is responsible for a different vertex range, and then performs mutually exclusive updates to the vertices.

Through the above two-stage update operation of low-degree vertices, scattered random access to a wide range of target vertices is avoided, and the throughput of vertex update is improved. At the same time, in comparison with forming a simultaneous pipeline, the two-stage update operation can be performed more efficiently than a simultaneous pipeline, effectively utilize all slave core groups, and avoid load imbalance between pipeline links.

According to another aspect of the present invention, a distributed parallel computing system is provided, which has multiple super nodes. Each super node is composed of multiple nodes. Each node is a computing device with computing capabilities. The communication speed between the nodes inside the super node is faster than the communication speed between nodes across super nodes. The nodes are divided into grids, with one node in each grid. The internal nodes of a super node are logically arranged in a row. The distributed parallel computing system stores the graph and perform graph computation according to the following rules: obtain data of a graph to be computed, the graph includes a plurality of vertices and edges, wherein each vertex represents a corresponding operation, wherein each edge connects a corresponding first vertex to a corresponding second vertex, the operation represented by the corresponding second vertex receives as input the output of the operation represented by the corresponding first vertex, and the edge X→Y represents the edge from vertex X to vertex Y, divide the vertices into the first extremely high degree class, the second high degree class and the third ordinary degree class, in which the vertices with a degree greater than the first threshold are marked as E and are divided into the first extremely high degree class, and the vertices with degrees between the first threshold and the second threshold are marked as H and divided into the second high degree class. Vertices with degrees lower than the second threshold are marked as R and divided into the third ordinary class. The first threshold is greater than the second threshold. For directed graphs, they are divided according to in-degree and out-degree respectively. The in-degree divided (or partition) set and the out-degree divided (or partition) set are marked Xi and Xo respectively, where X is E, H or R. Each super node is composed of multiple nodes. Each node is a computing device with computing capabilities. The communication speed between the nodes inside the super node is faster than the communication speed between nodes across super nodes. The nodes are divided into grids, with one node in each grid. The internal nodes of a super node are logically arranged in a row. The vertices are evenly divided into each node according to their serial numbers. Ri and Ro are maintained by the nodes they belong to. The Ho vertex status is synchronously maintained on the column that the Ho vertex belongs to, the Hi vertex status is synchronously maintained on the column that the Ho vertex belongs to and the row that the Ho vertex belongs to, and Eo status and Ei vertex status are the globally synchronously maintained. Eo and Ho are collectively called EHo, and Ei and Hi are collectively called EHi.

According to another aspect of the present invention, a computer-readable medium is also provided, on which instructions are stored, and when the instructions are executed by a distributed parallel computing system, the above-described method is performed.

DETAILED DESCRIPTION

Explanation of some terms used in this article are given below.

Node: Each node is a computing device with computing capabilities.

Supernode: A supernode is composed of a predetermined number of nodes. The communication between nodes within the supernode is physically faster than the communication between nodes across the supernode.

Maintaining vertex status: When related edge processing needs to be performed, if the associated vertex does not belong to the local machine, the vertex status data will be synchronized from the node to which the vertex belongs through network communication to establish a delegate, so that the edge update operation can directly operate local delegates without having to access remote vertex primitives.

Delegate (or agent) of a vertex: When the associated vertex does not belong to the local machine, the copy established through communication and responsible for the local update of the edge is called the delegate of the vertex. A delegate can be used to proxy outgoing edges and proxy incoming edges: when an outgoing edge is proxied, the source vertex synchronizes the current state to its delegate through communication; when an incoming edge is proxied, the delegate first merges part of the edge messages locally, and then the merged messages are sent to target vertices via communication.

Slave core: Computational processing unit (CPE) in heterogeneous many-core architecture.

As an example but not a limitation, the graph data in this article is, graphs, for example, social networks, web page data, knowledge graphs, and others that are recorded, stored, and processed in the form of data. The size of a graph can, for example, reach tens of trillions of vertices and hundreds of billions of edges.

Large-scale graph data needs to be divided (or distributed) to various computing nodes of the distributed graph computing system.

Figure 1:
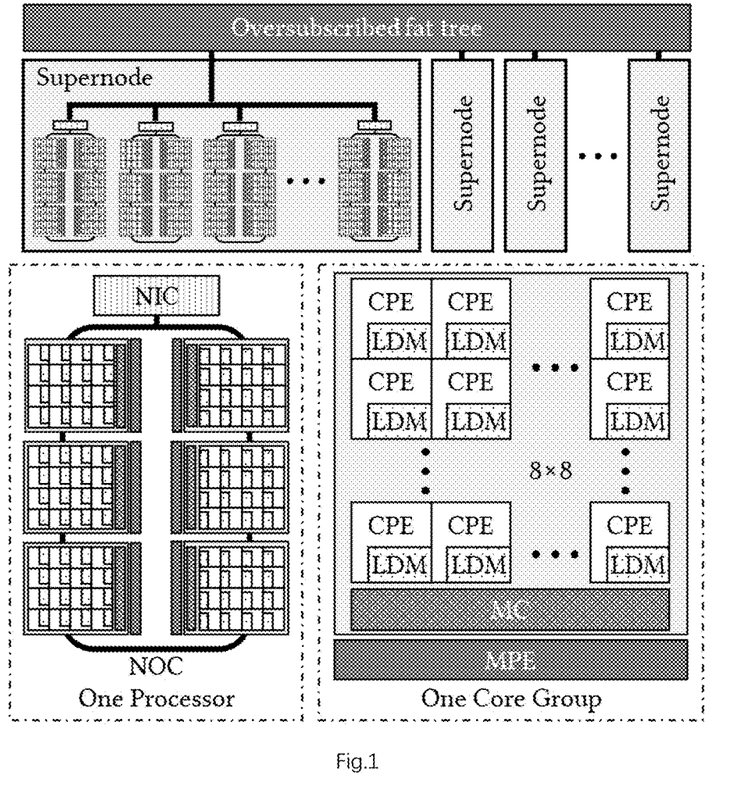
FIG. 1 shows a schematic architectural diagram of a supercomputer Shenwei equipped with super nodes that can be applied to implement graph data calculation according to an embodiment of the present invention.

FIG. 1 shows a schematic architectural diagram of a supercomputer Shenwei equipped with super nodes that can be applied to implement graph data calculation according to an embodiment of the present invention. In the figure, MPE represents the management processing unit (referred to as the main core), NOC represents the network on chip, CPE represents the computing processing unit (referred to as the slave core), LDM represents the local data storage, NIC represents the interconnection network card, and LDM represents the local data memory (Local Data Memory), MC stands for memory controller.

The graph includes a plurality of vertices and edges, wherein each vertex represents a corresponding operation, and wherein each edge connects a corresponding first vertex to a corresponding second vertex, the operation represented by the corresponding second vertex receives as input the output of the operation performed by the corresponding first vertex. An edge X→Y represents the edge from vertex X to vertex Y.

As shown in the figure, the oversubscribed fat tree is an interconnection network topology. Each super node is connected to each other and communicates through the central switching network of the oversubscribed fat tree. The processors in each super node communicate through local fast network; in contrast, communication across supernodes requires the oversubscribed fat tree, so the bandwidth is lower and the latency is higher.

I. First Embodiment: 1.5-Dimensional Graph Division Based on 3-Level Degree

According to an embodiment of the present invention, a hybrid dimension division method based on vertices of three types of degree is provided. The vertex set is divided into three types: extremely high degree (E for Extreme, for example, the degree is greater than the total number of nodes), high degree class (H for High, for example, the degree is greater than the number of nodes in the super node) and regular degree class (R for Regular). Sometimes R-type vertices are also called L-type vertices (L for Low, that is, vertices with relatively low degree). For a directed graph, it is divided according to in-degree and out-degree respectively. The in-degree divided (or partition) set and the out-degree partition set are marked as Xi and Xo respectively, where X is E, H or R. In this embodiment, at the same time, a super node is composed of a predetermined number of nodes. The communication speed between nodes within the super node is faster than the communication speed between nodes across the super node. The nodes are divided into grids, with one node in each grid. The internal nodes of the super node are logically arranged in a row, or in other words, a row is mapped to the super node. The vertices are evenly divided into each node according to the number (serial number). Ri and Ro are maintained by the node to which they belong. The Ho vertex status is maintained synchronously on the column that the Ho vertex belongs to. Hi vertex status is maintained synchronously on the column that the Hi vertex belongs to and the row that the Hi vertex belongs to, and Eo and Ei vertex status are synchronously maintained globally. In this article, for the convenience of description, Eo and Ho are collectively called EHo, which means Eo and Ho, and Ei and Hi are collectively called EHi, which means Ei and Hi.

Regarding node classification, mark the vertices with degree greater than the first threshold as E and classify them into extremely high degree class. Mark the vertices with degrees between the first threshold and the second threshold as H and classify them into high degree classes. Vertices with degree lower than the second threshold are marked R and classified into the ordinary (or normal, or common) degree class, and the first threshold is greater than the second threshold. The thresholds here can be set as needed. For example, in one example, the first threshold is the total number of nodes, which means that vertices with a degree greater than the total number of nodes belong to the extremely high degree category, and the second threshold is the number of nodes within the supernode, That is, vertices whose degree is greater than the number of nodes in a supernode but less than the total number of nodes are classified into the high degree class, while vertices whose degree is less than the number of nodes in a supernode are classified into the ordinary class. In another example, the first threshold is the total number of nodes multiplied by a constant coefficient, and the second threshold is the number of nodes within the supernode multiplied by a second constant coefficient.

Different partitioning (or classifying, or dividing) strategies can be regarded as different agency strategies.

Set delegates (or agent, or proxy) on all nodes for Eo and Ei vertices. These extremely high degree vertices should be connected by a large number of edges that cover almost all nodes on the other side. For E vertices, creating proxies on all nodes helps reduce communication.

Delegates are arranged on the columns for the Ho vertices, and messages are sent along the rows; delegates are arranged on the rows and columns for the Hi vertices, and depending on the subgraph to which the edge belongs, the delegates on the rows or columns are selected to merge messages, and then sent to the target vertex. During the traversal process, vertices with medium degrees are generally connected to a larger number of edges such that the other end covers all super nodes. There are obviously more H vertices than E vertices. If global delegates are arranged for H vertices like for E vertices, it will cause a lot of unnecessary communication. Considering the hierarchical network topology, not creating a proxy will cause data to be repeatedly communicated across the supernode, that is, the same data is constantly sent to or out of different nodes within the supernode, thus creating a bottleneck. Place proxies for these H vertices on rows and columns. This helps eliminate repeated sending of messages to the same supernode while avoiding costly global proxies.

No delegate is set for R vertices. As vertices having low enough degree, there is little gain in assigning delegates to them, while requiring time and space to manage the delegates. Therefore, proxies are not set for R vertices, but remote edges are used to connect to other vertices. When accessing these edges, messages need to be passed on each edge: when the Ro vertex wants to update a neighbor vertex, it sends its own number and edge message to the target vertex or its incoming edge delegate through network communication to achieve the update; when the Ri vertex needs to accept the update request of a neighbor vertex, the neighbor (source) vertex sends, from itself or through the outgoing edge delegate, the source number and edge message to the Ri vertex through network communication to implement the update.

Figure 2:
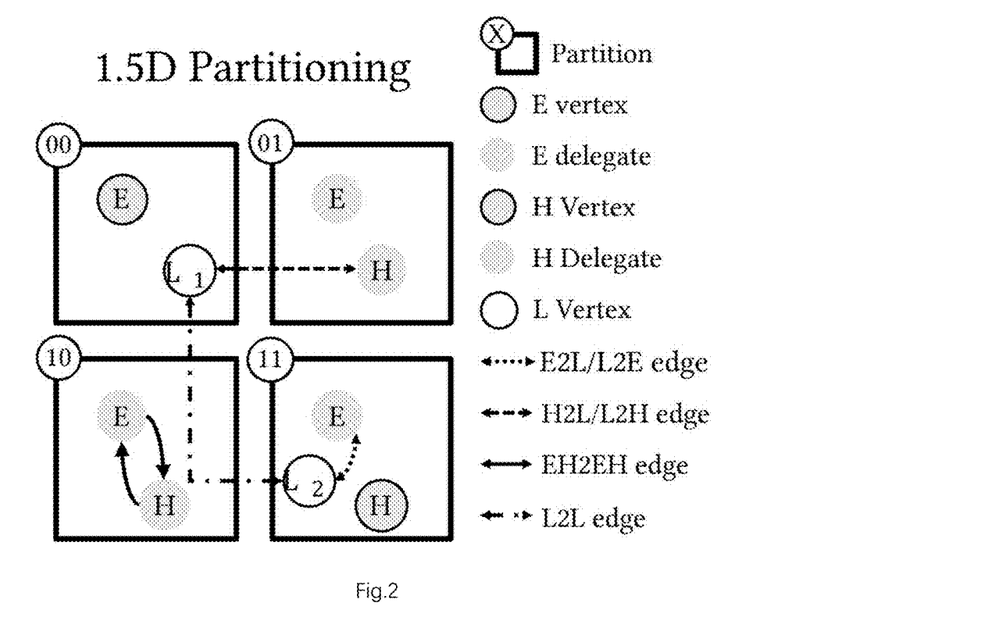
FIG. 2 shows a schematic diagram of a graph partitioning strategy according to an embodiment of the present invention.

FIG. 2 shows a schematic diagram of a graph partitioning strategy according to an embodiment of the present invention.

In a preferred embodiment, as shown in FIG. 2, the allocation and storage of vertex-corresponding delegates are performed according to edge conditions. The X2Y form in FIG. 2 and other graphs represents the edge from the source vertex X to the target vertex Y, and 2 represents the English word "to".

For the edge EHo→EHi, this type of edge is stored in such a node that the node is on the grid column where the source vertex node is located and on the grid row where the target vertex node is located, that is, the subgraph inside the high-degree vertex is divided into two dimensions, and communication traffic is minimized. This is, for example, schematically illustrated in node 01 shown in FIG. 2.

For the edge Eo→Ri, this type of edge is stored on the node where the R vertex is located to allow global maintenance of extremely high-degree vertices during calculation. The vertex state is first sent to the delegate of the Eo vertex, and then the Ri vertex on the local machine is updated through the delegate, so as to reduce the amount of messages that need to be communicated. For example, This is, for example, schematically illustrated as edge E→L2 shown in node 11 of FIG. 2.

For the edge Ho→Ri, this type of edge is stored at such a node, that the node is on the grid column where the H vertex is located, and is on the grid row where the R vertex is located, to allow the high degree vertices to be maintained on the columns during calculation, and their communication messages are aggregated in the communication across the super node. When for the Ho vertex, the message needs to be sent to multiple target vertices of the same super node, because the source vertex has an available delegate node in its own column and the row of the target vertex, so a message is first sent across the supernode to the available delegate node, and then the available delegate node sends it to all target vertices through the fast network within the super node.

For the edge Ro→Ei, this type of edge is stored on the node where the R vertex is located to allow global maintenance of extremely high degree vertices during computation and aggregation of their communication messages; for example, node 11 in FIG. 2.

For the edge Ro→Hi, this type of edge is stored in the node where the R vertex is located, but the H vertex is stored according to the number on the column where it is located, so as to allow the calculation to accumulate its update messages on the nodes in the row where R is located and the column where H is located, and the aggregation of network communication across super nodes; for example, the communication of L1-H in node 01 in FIG. 2.

For the edge Ro→Ri, forward edges and reverse edges are stored at the source and target vertices respectively, and edge messages are implemented by forwarding along rows and columns on the communication grid. For example, L1 and L2 in nodes 00 and 11 in FIG. 2.

The above three classes of vertices and six types of edge division can effectively solve the strong load skew caused by power law distribution: the edges associated with the high-degree vertices will be stored according to the two-dimensional division or the one-dimensional division on the destination side, depending on the situation, so that the number of edges is maintained globally evenly, thereby ensuring dual balance of storage and load. Such a division can solve the problem of extremely large vertices in extreme graphs.

After the above classification, the processing of H vertex sets is much more efficient than the processing of simple one-dimensional division of high-degree vertices. For example, originally the Ho vertex needs to send messages on each edge, and will send messages to multiple nodes in the same super node, thus consuming the top-level network bandwidth; after this optimization, the message will only be sent once to each super node, thus saving top-level network. At the same time, since it is only sent once to one delegate node in the target super node, a large amount of useless communication and additional storage will not be introduced.

Figure 3:
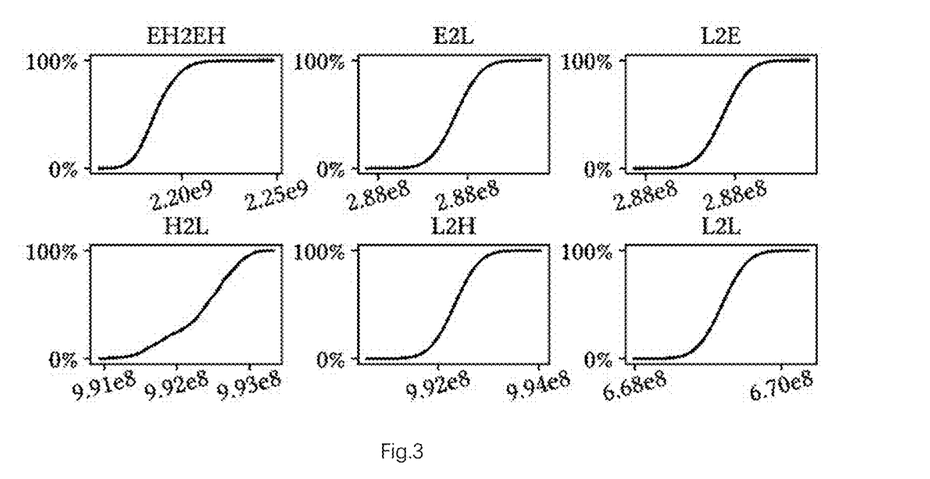
FIG. 3 shows a schematic diagram of the edge number distribution of sub-graphs at the scale of the whole machine in the 1.5-dimensional division according to the embodiment of the present invention.

As an application example, in the 1.5-dimensional division of the embodiment of the present invention, the edge number distribution of the subgraph at the scale of the whole machine is shown in FIG. 3 (drawn according to the cumulative distribution function). The range (that is, the relative difference between the maximum value and the minimum value) does not exceed 5% in EH2EH and only 0.35% in other subfigures.

As an implementation example, select E and H vertices from all vertices and sort each node by degree. The remaining vertices are L vertices, retaining the original vertex IDs. We further split the original edge set into 6 parts. Since E and H have delegates on columns and rows, a subgraph whose ends are E or H (sometimes, this article calls it EH2EH, or EH→EH) is 2D partitioned. The two subgraphs from E to L (E2L) and from L to E (L2E) are attached to the owner of L, just like heavy vertex and heavy delegate in 1D partitioning. With the same reason, we distribute H2L over the owner's column of H, limiting messaging within the row. L2H is stored only with the owner of L, as opposed to H2L. Finally, L2L is the simplest component, just like in the original 1D partitioning. The resulting partition can be shown in FIG. 2. Each subgraph is well balanced between nodes, even at full scale. The balance of this partitioning method will be introduced later.

When |H|=0, that is, there are no high-degree vertices, only extremely high-degree vertices and ordinary vertices. The method of the embodiment of the present invention degenerates into a one-dimensional partition similar to a dense delegate (heavy delegate). The difference is that in the present invention edges between heavy vertex are partitioned in two dimensions. Compared to one-dimensional partitioning with dense representation, the inventive method further isolates high-degree vertices into two levels, resulting in topology-aware data partitioning. It preserves enough heavy vertices to allow for better early exit in directional optimizations. It also avoids globally sharing the communication of all these heavy vertices by setting up proxies for H only on rows and columns.

When |L|=0, that is, when there are only extremely high-degree vertices and high-degree vertices, it degenerates into a two-dimensional partition with vertex reordering. Compared with 2D partitioning, our method avoids inefficient proxies for low-degree (L) vertices and eliminates the spatial constraints of 2D partitioning. In addition, embodiments of the present invention also construct global proxies for overweight or super heavy (E) vertices, thereby reducing communication.

II. Second Implementation: Sub-Iteration Self-Adaptive Direction Selection

According to an embodiment of the present invention, sub-iteration self-adaptive direction selection to support fast exit is also proposed.

In many graph algorithms, the direction of graph traversal, that is, "pushing" from source vertices to target vertices or "pulling" source vertices from target vertices, can greatly affect performance. For example:

1. In BFS (Breadth First Search), if the "push" mode is used for the wider middle iteration, a large number of vertices will be repeatedly activated. If the "pull" mode is used for the narrower head and tail iterations, the low proportion of active vertices will result in many useless calculations, it is required to automatic switch selections between the two directions;
2. In PageRank, the subgraph that traverses the graph locally and reduces should use the "pull" mode to obtain optimal computing performance ("pull" is random reading, "push" is random writing), and the subgraph involving remote edge messages should use "push" mode to minimize communication traffic.

In view of this situation, an embodiment of sub-iteration adaptive direction selection is proposed. Specifically, two traversal modes of "push" and "pull" are implemented, and the traversal mode is automatically selected according to the proportion of active vertices. More specifically, for the three types of locally calculated edges EHo→EHi, Eo→Ri, and Ro→Ei, "pull" or "push" mode is selected according to whether the activity ratio of the target vertices exceeds the configurable threshold; for the three types of locally calculated edges: Ho→Ri, Ro→Hi, Ro→Ri, "Pull" or "Push" mode is selected according to whether the ratio of the active ratio of the target vertices to the ratio of active ratio of the source vertices exceeds a configurable threshold.

In the breadth-first search, it is judged whether the iteration is at the head and tail or in the middle. When it is judged that the iteration is at the head and tail, the graph traversal is performed by "pulling" from the target vertex to the source vertex; when it is judged that the iteration is in the middle, the graph traversal is performed by source vertices "pushing" to target vertices.

In PageRank, subgraphs that traverse the graph locally and reduce use the "pull" mode to achieve optimal computing performance, while subgraphs involving remote edge messages use the "push" mode to minimize communication volume.

In the pull mode, set the status mark of the vertex to determine whether the status of a vertex has reached the dead state. In the dead state, the vertex will not respond to more messages; after confirming that the dead state has been reached, the rest message processing will be skipped. For example, the following code provides a quick exit interface to support performance optimization of traversal algorithms: users can pass in the parameter fcond to determine whether a message will still be updated to skip the remaining messages.

```
template<typenameMsg> voidedge_map(
    auto&vset_out, auto&vset_in,
    std::initializer_list<vertex_data_base*>src_data,
    std::initializer_list<vertex_data_base*>dst_data,
    autofmsg, autofaggr, autofapply,
    auto fcond, Msgzero);
```

Through the above-mentioned implementation scheme of sub-iteration adaptive direction selection that supports quick exit, the traversal direction can be adaptively switched to avoid useless calculations, minimize communication volume, and optimize graph computing performance.

III. The Third Implementation: Optimizing the Segmented Subgraph Data Structure of the EH Two-Dimensional Divided Subgraph In the power-law distribution graph, simulations found that the number of edges in the subgraph EHo→EHi will account for more than 60% of the entire graph, which is the most important calculation optimization goal. For this subgraph, an implementation is proposed to introduce the segmented subgraph (Segmented Sub-Graph, SSG) data structure for optimization.

Figure 4:
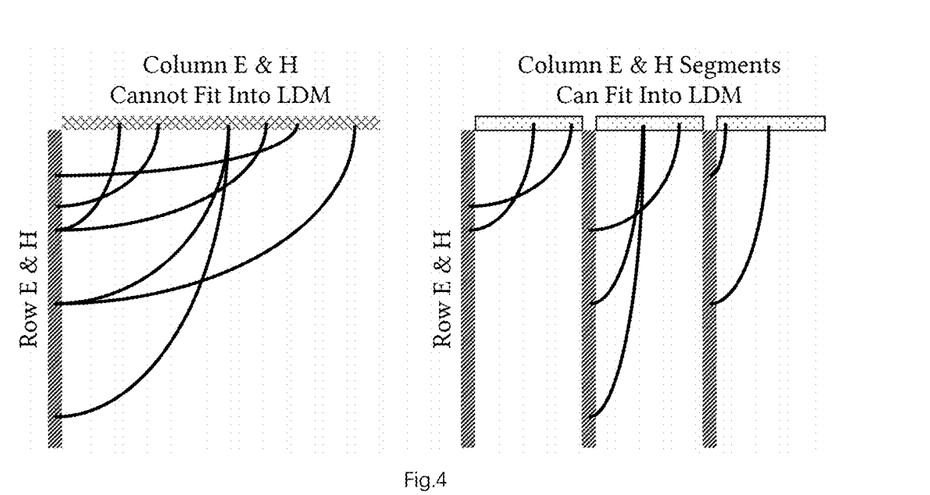
FIG. 4 shows a schematic diagram of traditional graph storage in the form of a sparse matrix (left part of FIG. 4) and segmented subgraph storage optimization according to an embodiment of the present invention (right part of FIG. 4).

Compressed Sparse Row (CSR) format is the most common storage format for graphs and sparse matrices. In this format, all adjacent edges of the same vertex are stored continuously, supplemented by an offset array to support its indexing function. Since the range of vertices of a single large graph is too large, the spatiotemporal locality of accessing the data of neighboring vertices is very poor. The following segmented subgraph method is proposed: for subgraph whose both the source vertex and the target vertex is of high degree (sparse matrix), the forward graph is segmented according to the target vertices (columns of the matrix), and the reverse graph is segmented according to the source vertices (rows of the matrix) (here the forward graph refers to the directed graph from the source vertex to the target vertex, and the reverse graph refers to the directed graph from the target vertex to the source vertex. The graph is divided into multiple SSG components, so that the target vertices in each SSG are limited to a certain range. As an example, in a typical general-purpose processor, this range is generally chosen to be a size that can be stored in the Last Level Cache (LLC). FIG. 4 shows traditional graph storage in the form of a sparse matrix (left part of the figure) and segmented subgraph storage optimization according to an embodiment of the present invention (right part of FIG. 4).

In one example, based on the architectural characteristics of China's domestic heterogeneous many-core processors, the remote access mechanism of local data memory LDM (Local Data Memory) was chosen to replace fast random target access on the LLC. First, the target vertex segment of an SSG is stored in an LDM of a slave core array, and then during the graph traversal process, each slave core uses RLD (Remote Load) to retrieve data from the other slave core that owns the target vertex. Combined with the small number of high degree vertices, even on a large scale, all random accesses in EHo→EHi subgraph processing can be implemented through LDM through a small number of segmented subgraphs, without using Discrete accesses on main memory (GLD, GST).

In one example, the target vertices of the first extremely high degree class and the second high degree class are numbered according to the following rules: from high bit to low bit, they are segment number, cache line number, slave core number and slave core local number. In a specific example, the number of bits in the cache line number is calculated based on the sum of the sizes of the vertex data elements to ensure that the local data memory LDM can store them all; the next six bits are used to distinguish the slave core number to which it belongs (for example, a total of $2^6=64$ slave core); the number of bits in the local number of the slave core is calculated based on the minimum vertex data element size to ensure DMA efficiency. More specifically, each slave core can first use a DMA operation with stride to prefetch the vertex data within the segment according to the slave core number bit; during edge processing in pull mode, when the target vertex EHi of the extremely high degree class and the second high-degree class is read, the local data memory is used to remotely load the LDM RLD to read the corresponding address of the LDM of the slave core which owns the source vertex.

Through the segmented subgraph method for EH vertices in this embodiment, the graph (sparse matrix) is segmented according to the target vertex (column of the matrix), and a graph is divided into multiple SSG components, so that the target vertex in each SSG is limited Within a certain range, it avoids or alleviates the traditional problem of very poor spatiotemporal locality of data accessing neighboring vertices due to the excessive range of vertices of a single large graph.

The segmented subgraph method of the third embodiment is not limited to the 1.5-dimensional graph dividing method of the first embodiment, but can be applied to a subgraph composed of source vertices and target vertices that are relative high-degree vertices divided according to any other criteria.

IV. Fourth Implementation Option: Collective Communication Optimization of High-Degree Vertices In the vertex-centered graph computing programming model, the reduction of vertex data is a custom function provided by the user and cannot be mapped to the reduction operator of MPI. The reduction process of high-degree vertex data and the calculations required for them has a large loop merging space, and the amount of memory access involved is also relatively significant. This embodiment uses a slave core group to optimize this communication process, and the optimization process can be embedded in the processing of EH subgraph.

Figure 5:
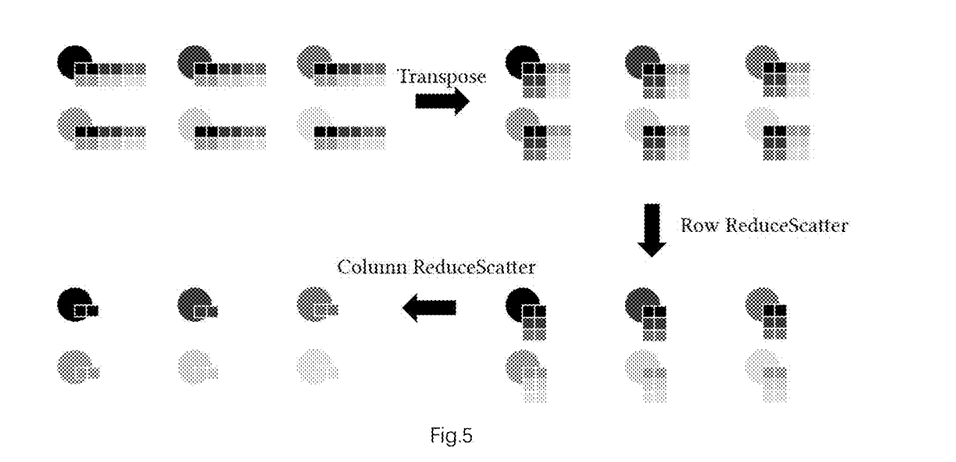
FIG. 5 shows a schematic diagram of processing of reduce scatter type communication according to an embodiment of the present invention.

Specifically, in the embodiment, for the reduction distribution (Reduce Scatter) type communication of the target vertex EHi of the first extremely high degree class and the second high degree class, the following optimization processing is performed: for the reduction on rows and columns, use Ring algorithm; for global reduction, the message is first transposed locally to change the data from row-major to column-major, and then the reduction distribution on the row is first called, and then the reduction scatter on the column is called to reduce the cross-supernode communication on columns. FIG. 5 shows a schematic diagram of processing of reduction scatter type communication according to an embodiment of the present invention.

Through the collective communication optimization described above, cross-supernode communication on the columns can be reduced. Hierarchical reduction scatter eliminates redundant data within supernodes in the first step of reduction on the row, making communication across supernodes in the second step minimal and without redundant.

The collective communication method of the fourth embodiment is not limited to graph computation using the 1.5-dimensional graph partitioning method of the first embodiment, but can be applied to a subgraph composed of source vertices and target vertices that are relative high degree vertices divided according to any other criteria.

V. Fifth Implementation: RMA-Based On-Chip Sorting Core

In message communication, since the generated messages are out of order, they need to be bucketed according to the target node before Alltoallv (variable length global to global) communication can be carried out. In addition, the message generation part also requires a bucketing step to distribute the messages to the target nodes. Therefore, a common core module is needed to bucket sort messages.

Figure 6:
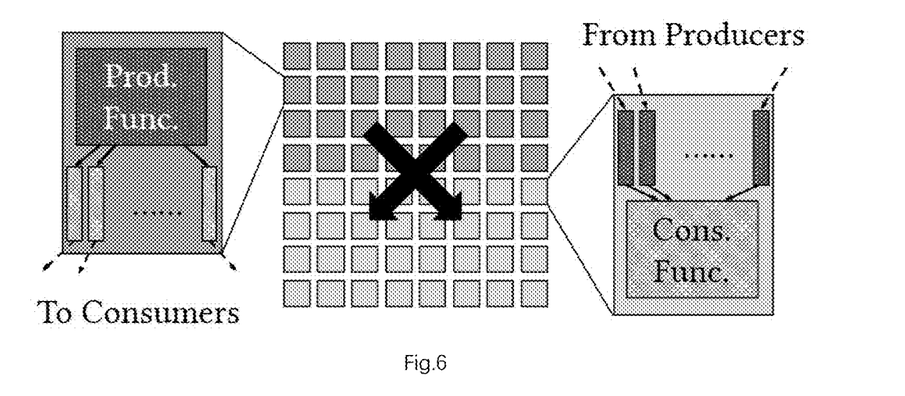
FIG. 6 schematically shows a flow chart of the process of classifying slave cores, distributing data within a core group, and writing to external buckets according to an embodiment of the present invention.

In bucket sorting, if we simply perform parallelism between slave cores, on the one hand, it will cause conflicts when multiple slave cores write to the same bucket and introduce atomic operation overhead. On the other hand, each slave core will take care of too many buckets, thus shrink the size of LDM buffer, and reduce the memory access bandwidth utilization efficiency. Taking the above two points into consideration, this implementation plan according to the present embodiment is based on the idea of lock-free data distribution in the core group and carries out a new design on the new many-core platform architecture. It will classify the cores according to their functions and utilize RMA (Remote Memory Access). operation to firstly perform a round of data distribution within the core group, and then perform writing to external buckets memory access. FIG. 6 schematically shows a flow chart of the process of classifying slave cores, distributing data within a core group, and writing to external buckets according to an embodiment of the present invention. In the figure, the CPE core groups are arranged in an 8*8 array.

In one example, the process is performed on a heterogeneous many-core processor. In the processing of edge messages, the message generation part and the message rearrangement part use bucketing steps to distribute the messages to the target nodes;

The core is divided into 2 categories by row, producers and consumers. The producer obtains data from the memory and performs data processing at the current stage. If there is data generated, it is placed according to the target address to the consumer who should process the message. In the sending buffer, when the buffer is full, it is passed to the corresponding consumer through RMA. The consumer receives the message passed by RMA and performs subsequent operations that require mutual exclusion (such as appending to the end of the communication buffer in main memory, or updating vertex status).

In order to allow, for example, the six core groups of a computing node in the Sunway supercomputer architecture to collaborate for on-chip sorting, within the core group, the producers and consumers are numbered 0-31 in row priority order, each core group consumers with the same number are responsible for the same output bucket, and core groups use atomic fetch and add (implemented using atomic comparison assignment) on the main memory to count the tail position of the bucket. Testing shows that this atomic operation does not introduce significant overhead when the memory access granularity is sufficient.

The on-chip sorting module in the above embodiment directly performs message generation and forwarding bucket operations, realizing slave core acceleration and improving processing efficiency. It is a major innovation in this field from scratch.

The collective communication method of the fifth embodiment is not limited to graph calculation using the 1.5-dimensional graph partitioning method of the first embodiment, but can be applied to other situations.

VI. Sixth Implementation Plan: Two-Stage Update of Low-Degree Level Vertices

In the processing of edge messages on heterogeneous many-core processors, the message update part uses two-stage sorting to implement random updates of local vertices:

First, perform bucket sorting on all update operations to be performed, cluster the vertices into the same bucket according to number, and sort all messages into each bucket to ensure that the number of vertices in each bucket is small enough that the vertex information can be placed in the LDM of one core group, which is called coarse-grained sorting; in the next step of fine-grained sorting update, each of a slave core group processes messages from one bucket at a time, and delivers the message groups to each consumer core through on-chip sorting. Each consumer kernel is responsible for different vertex ranges, and then performs mutually exclusive updates to the vertices.

Through the above two-stage update operation of low-degree vertices, scattered random access to a wide range of target vertices is avoided, and the throughput of vertex update is improved. At the same time, the two-stage update operation can be performed more efficiently than a simultaneous pipeline, effectively utilize all slave core groups, and avoid load imbalance between pipeline links.

The above embodiments can also be implemented in combination with and/or using other means, such as distributed parallel computing systems, computer-readable storage media, and computer programs in various languages.

According to another embodiment, a distributed parallel computing system is provided with multiple super nodes, each super node is composed of multiple nodes, each node is a computing device with computing capabilities, and inter-node communication within the super node is faster than the communication speed between nodes across super nodes. The nodes are divided into grids (or mesh), with one node in each grid. The internal nodes of a super node are logically arranged in a row. The distributed parallel computing system stores graphs and perform a graph computation according to the following rules: obtain data for a graph to be computed, the graph including a plurality of vertices and edges, where each vertex represents a corresponding operation, where each edge connects a corresponding first vertex to a corresponding second vertex, the operation represented by the corresponding second vertex receives as input the output of the operation represented by the corresponding first vertex. The edge X→Y represents the edge from vertex X to vertex Y, the vertices are divided into the first extremely high degree (or level) class, the second high degree class and the third ordinary degree class, in which the vertices with degree greater than the first threshold are marked as E and are divided into the first extremely high degree class, and the vertices with degree between the first threshold and the second threshold are marked as H and are divided into the second high degree category, the vertices with degrees lower than the second threshold are marked as R and are divided into the third ordinary (or common, or general) degree class (or category). The first threshold is greater than the second threshold; for directed graphs, they are divided according to in-degree and out-degree respectively. The in-degree divided (or partition) set and the out-degree divided (or partition) set are marked Xi and Xo respectively, where X is E, H or R. The vertices are evenly divided into each node according to their serial numbers. Ri and Ro are maintained by the nodes they belong to. The Ho vertex status is synchronously maintained on the column that the Ho vertex belongs to. The Hi vertex state is maintained synchronously on the columns and rows, and the Eo and Ei vertex states are maintained globally and synchronously. Eo and Ho are collectively called EHo, and Ei and Hi are collectively called EHi.

According to another embodiment, a computer-readable medium is provided, having instructions stored thereon, the instructions, when executed by a distributed parallel computing system, perform the following operations: obtain data of a graph to be computed, the graph includes a plurality of vertices and edges, wherein each vertex represents a corresponding operation, wherein each edge connects a corresponding first vertex to a corresponding second vertex, the operation represented by the corresponding second vertex receives as input the output of the operation represented by the corresponding first vertex, and the edge X→Y represents the edge from vertex X to vertex Y; divide the vertices into the first extremely high degree class, the second high degree class and the third ordinary degree class, in which the vertices with a degree greater than the first threshold are marked as E and are divided into the first extremely high degree class, the vertices with degrees between the first threshold and the second threshold are marked as H and divided into the second high degree class, vertices with degrees lower than the second threshold are marked as R and divided into the third ordinary class. The first threshold is greater than the second threshold. For directed graphs, they are divided according to in-degree and out-degree respectively. The in-degree divided (or partition) set and the out-degree divided (or partition) set are marked as Xi and Xo respectively, where X is E, H or R. The vertices are evenly divided into each node according to their serial numbers. Ri and Ro are maintained by the nodes they belong to. The Ho vertex status is synchronously maintained on the column that the Ho vertex belongs to, the Hi vertex status is synchronously maintained on the column that the Ho vertex belongs to and the row that the Ho vertex belongs to, and Eo status and Ei vertex status are the globally synchronously maintained. Eo and Ho are collectively called EHo, and Ei and Hi are collectively called EHi.

In the foregoing description, as an example, the graph calculation method is performed by a supercomputer. However, this is only an example and not a limitation. It is clear to those skilled in the art that some methods can also be performed by a smaller cluster, for example.

Although this specification contains many specific implementation details, these should not be construed as limitations on the scope of any invention or what may be claimed, but rather as descriptions of features that may be specific to particular embodiments of a particular invention. Certain features that are described in this specification in the context of separate embodiments can also be implemented in combination in a single embodiment. Conversely, various features that are described in the context of a single embodiment can also be implemented in multiple embodiments separately or in any suitable subcombination. Furthermore, although features may be described above as operating in certain combinations and even originally claimed as such, one or more features from a claimed combination can in some cases be excluded from that combination, and so claimed combinations may involve sub-combinations or variations of sub-combinations.

Similarly, although operations are depicted in a specific order in the figures, this should not be understood as requiring that such operations be performed in the specific order shown or in sequential order or that all illustrated operations be performed to obtain desirable results. In some cases, multitasking and parallel processing may be advantageous. Furthermore, the separation of various system modules and components in the above embodiments should not be understood as requiring such separation in all embodiments, but it should be understood that the program components and systems described can generally be integrated together into a single software product in or packaged into multiple software products.

The embodiments of the present invention have been described above. The above description is illustrative, not exhaustive, and is not limited to the disclosed embodiments. Many modifications and variations will be apparent to those skilled in the art without departing from the scope and spirit of the described embodiments. Therefore, the protection scope of the present invention should be subject to the protection scope of the claims.

The invention claimed is:

1. A graph computing method based on distributed parallel computing, including:

obtaining data of a graph to be computed, the graph including a plurality of vertices and edges, wherein each vertex represents a corresponding operation, wherein each edge connects a corresponding first vertex to a corresponding second vertex, the operation represented by the corresponding second vertex receives an output of the operation represented by the corresponding first vertex as input, and an edge X→Y represents the edge from vertex X to vertex Y, dividing the vertices into a first extremely high degree class, a second high degree class and a third ordinary class according to degree of the vertices, wherein vertices with degrees greater than a first threshold are marked as E and are divided into the first extremely high degree class, vertices with degree between the first threshold and a second threshold are marked as H and are divided into the second high degree class, vertices with degrees lower than the second threshold are marked as R and are divided into the third ordinary class, and the first threshold is greater than the second threshold; for directed graphs, vertices are divided according to in-degree and out-degree respectively, an in-degree partition set and an out-degree partition set are marked as Xi and Xo respectively, where X is E, H or R, and wherein a super node is composed of a predetermined number of nodes, each node being a computing device with computing power, wherein communication speed between nodes within a super node is faster than the communication speed between nodes across the super node, nodes being divided into grids, with one node in each grid and internal nodes in a super node being logically arranged in a row, vertices being evenly distributed to each node according to their serial numbers, vertices Ri and Ro being maintained by nodes they belong to, Ho vertex status is maintained on a column that the Ho vertex belongs to, the Hi vertex state being maintained on a column that the Hi vertex belongs to and a row that the Hi vertex belongs to, and Eo vertex status and Ei vertex status are maintained globally, Eo and Ho being collectively called EHo, and Ei and Hi being collectively called EHi.

2. The graph computing method of claim 1, allocation and storage of vertex-corresponding delegates is performed according to edge conditions as follows:
  for the edge EHo→EHi, this type of edge is stored on such a node that the node is on a grid column where a source vertex of the edge is located and the node is on a grid row where a target vertex of the edge is located;
  for the edge Eo→Ri, this type of edge is stored on the node where the R vertex is located to allow global maintenance of extremely high degree vertices during calculation and aggregation of their communication messages;
  for the edge Ho→Ri, this type of edge is stored on such a node, that the node is on the grid column where the H vertex is located, and the node is on the grid row where the R vertex is located, to allow the maintain of high-degree vertices on columns during calculation and aggregation of communication messages in communication across the super node, when for the Ho vertex, a message needs to be sent to multiple target vertices of the same super node, because the source vertex has an available delegate node in its own column and on the row of its target vertices, so a message is first sent to the available delegate node across the super node and then sent to all target vertices by the available delegate node through a network within the super node;
  for the edge Ro→Ei, this type of edge is stored on the node where the R vertex is located to allow global maintenance of extremely high degree vertices during calculation and aggregation of their communication messages;
  for the edge Ro→Hi, this type of edge is stored on the node where the R vertex is located, but the H vertex is stored according to a serial number of the H vertex on the column, so as to allow the calculation to accumulate its update messages on the node in the row where R is located and the column where H is located, and the aggregation of network communication across super nodes;
  for the edge Ro→Ri, forward and reverse edges for this type of edges are stored at the source vertices and target vertices respectively, and edge messages are implemented by rows forwarding and columns forwarding on communication grids.

3. The graph computing method of claim 1, wherein the first threshold is a total number of nodes multiplied by a constant coefficient, and the second threshold is the number of nodes in the super node multiplied by a second constant coefficient.

4. The graph computing method of claim 1, two traversal modes of "push" and "pull" are implemented, and the traversal mode is automatically selected according to a proportion of active vertices, for three types of locally calculated edges EHo→EHi, Eo→Ri, Ro→Ei, "pull" or "push" mode is select based on whether an activity ratio of the target vertex exceeds a configurable threshold; for three types of locally calculated edges Ho→Ri, Ro→Hi, and Ro→Ri, "Pull" or "Push" mode is selected according to whether a ratio of the activity ratio of the target vertices to the activity ratio of the source vertices exceeds a configurable threshold.

5. The graph computing method of claim 1, wherein
  in a breadth-first search, it is judged whether an iteration is at a head or tail or in a middle, when it is judged that the iteration is at the head or tail, a graph traversal is performed by "pulling" from a target vertex to a source vertex; when it is judged that the iteration is in the middle, a manner of the source vertex "pushing" to the target vertex is used for graph traversal; and
  in PageRank, subgraphs that locally traverse the graph and reduce use a "pull" mode to achieve improved computing performance, while subgraphs involving remote edge messages use a "push" mode to reduce communication volume.

6. The graph computing method of claim 5, further comprising:
  in the pull mode, setting a status mark of the vertex to determine whether the status of a vertex has reached a dead state, in the dead state, the vertex will not respond to more messages;
  after confirming that the dead state has been reached, processing of the any remaining messages is skipped.

7. The graph computing method of claim 2, for a subgraph in which both the source vertex and the target vertex belong to the first extremely high-degree class and the second high-degree class, a forward graph is segmented according to the target vertex, and a reverse graph is segmented according to the source vertices, and a graph is divided into multiple segmented subgraphs SSG (Segmented Sub-Graph), so that the target vertices in each segmented subgraph are limited to a certain range.

8. The graph computing method of claim 7 is performed on a general-purpose multi-core processor, and the certain range is a size that can be stored in a last level cache LLC (Last Level Cache).

9. The graph computing method of claim 7, wherein edge processing in pull mode is performed on heterogeneous many-core processors, using a remote access mechanism of local data memory LDM (Local Data Memory) to store a source vertex segmentation of a segmented subgraph SSG in the reverse graph into an LDM of a slave core array, and then during a graph traversal process, data is obtained from the slave core that owns the target vertex by slave core accessing RLD (Remote Load).

10. The graph computing method of claim 9, wherein the source vertices of the first extremely high degree class and the second high-degree class are numbered according to the following rules:
  from high bit to low bit: segment number; cache line number, slave core number, slave core local number.

11. The graph computing method of claim 10, the number of digits in the cache line number is calculated according to a sum of the sizes of vertex data elements to ensure that the local data memory LDM can store all of them; the next six bits are used to distinguish the slave core number to which it belongs; the number of local number digits is calculated based on the vertex data element size minimum to ensure DMA (Direct Memory Access) efficiency.

12. The graph computing method of claim 11, each slave core first uses a direct memory access DMA operation with stride to prefetch the vertex data in the segment according to the slave core number bit; during edge processing in pull mode, when reading the source vertex EHo of the first extremely high-degree class and the second high-degree class, the local data memory remote load (LDM RLD) is used to read the LDM corresponding address of the slave core to which the source vertex belongs.

13. The graph computing method of claim 1, for Reduce Scatter type communication of the target vertex EHi of the first extremely high degree class and the second high degree class: for reduction on rows and columns, a ring algorithm is used; for global reduction, message is first transposed locally to change data from row-major to column-major, and then reduction scatter on the row is first called, and then reduction scatter on the column is called to reduce communication across supernodes on the column.

14. The graph computing method of claim 1, the graph computing method is performed on a heterogeneous many-core processor, in the processing of edge messages, a message generation part and a message rearrangement part use bucketing steps to distribute messages to target nodes;
   slave cores are divided into 2 categories by row, producers and consumers, the producer obtains data from memory and performs data processing at current stage, if there is data generated, it is placed in a sending buffer corresponding to the consumer that should process the message according to target address, when the buffer is full, it is passed to a corresponding consumer through RMA (Remote Memory Access), the consumer receives the message delivered by RMA and performs subsequent operations that require mutual exclusion;
   consumers of a same number in each core group are responsible for a same output bucket, and counting of bucket tail position is implemented between core groups through atomic fetch and addition on main memory.

15. The graph computing method of claim 1, the graph computing method is performed on a heterogeneous many-core processor, in the processing of edge messages, a message update part uses two-stage sorting to implement random updates of local vertices:
   first, perform bucket sorting on all update operations to be performed, cluster vertices into a same bucket according to number, and sort all messages into each bucket to ensure that a number of vertices in each bucket is less than a predetermined threshold that vertex information can be placed in LDM of a core group, which is called coarse-grained sorting;
   each in a core group processes messages from one bucket at a time, and delivers message groups to each consumer core through on-chip sorting, each consumer core is responsible for a different vertex range, and then performs mutually exclusive updates to the vertices.

16. A distributed parallel computing system with multiple super nodes, each super node is composed of multiple nodes, each node is a computing device with computing capabilities, inter-node communication within the super node is faster than communication between nodes across the super node, the nodes are divided into grids, each grid has one node, and the internal nodes of a super node are logically arranged in a row, the distributed parallel computing system stores graphs and performs graph calculations according to the following rules:
   obtain data for a graph to be computed, the graph including a plurality of vertices and edges, wherein each vertex represents a corresponding operation, wherein each edge connects a corresponding first vertex to a corresponding second vertex, the operation represented by the corresponding second vertex receives the output of the operation represented by the corresponding first vertex as input, and edge X→Y represents the edge from vertex X to vertex Y,
   divide the vertices into a first extremely high degree class, a second high degree class and a third ordinary class according to degree of the vertice, wherein vertices with degrees greater than a first threshold are marked as E and are divided into the first extremely high degree class, vertices with degree between the first threshold and a second threshold are marked as H and are divided into the second high degree class, the vertices with degrees lower than the second threshold are marked as R and are divided into the third ordinary class, and the first threshold is greater than the second threshold; for directed graphs, vertices are divided according to in-degree and out-degree respectively, an in-degree partition set and an out-degree partition set are marked Xi and Xo respectively, where X is E, H or R,
   divide the vertices evenly to each node according to their serial number, vertices Ri and Ro are maintained by the nodes to which they belong, Ho vertex status is maintained synchronously on the column that the Ho vertex belongs to, the Hi vertex state is maintained synchronously on the column that the Hi vertex belongs to and row that the Hi vertex belongs to, and Eo vertex status and Ei vertex status are globally synchronously maintained, Eo and Ho are collectively called EHo, and Ei and Hi are collectively called EHi.

17. A non-transitory computer-readable medium having instructions stored thereon that, when executed by a distributed parallel computing system, perform the method of claim 1.

* * * * *